(12) United States Patent
Jones et al.

(10) Patent No.: US 11,397,286 B2
(45) Date of Patent: Jul. 26, 2022

(54) ACRYLIC POLYVINYL ACETAL FILM FOR A LIGHT DIRECTING ARTICLE

(71) Applicant: 3M INNOVATIVE PROPERTIES COMPANY, St. Paul, MN (US)

(72) Inventors: Todd D. Jones, St. Paul, MN (US); Bimal V. Thakkar, St. Paul, MN (US); Duane D. Fansler, Dresser, WI (US); Anthony F. Schultz, Forest Lake, MN (US); Jonathan E. Janoski, Woodbury, MN (US); David C. Lueneburg, Austin, TX (US); Carla S. Thomas, Woodbury, MN (US); Tien Yi T. H. Whiting, St. Paul, MN (US); Robert F. Watkins, White Bear Lake, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 896 days.

(21) Appl. No.: 16/307,875

(22) PCT Filed: Jun. 5, 2017

(86) PCT No.: PCT/US2017/035882
§ 371 (c)(1),
(2) Date: Dec. 6, 2018

(87) PCT Pub. No.: WO2017/214007
PCT Pub. Date: Dec. 14, 2017

(65) Prior Publication Data
US 2019/0302317 A1 Oct. 3, 2019

Related U.S. Application Data
(60) Provisional application No. 62/346,788, filed on Jun. 7, 2016.

(51) Int. Cl.
*G02B 1/14* (2015.01)
*C08L 29/14* (2006.01)
(Continued)

(52) U.S. Cl.
CPC .......... *G02B 1/14* (2015.01); *B29D 11/00615* (2013.01); *B32B 27/08* (2013.01);
(Continued)

(58) Field of Classification Search
CPC .... G02B 5/12–5/136; G02B 1/00–1/18; C08L 33/00–33/26; C08L 29/00–29/14; B32B 27/00–27/42
See application file for complete search history.

(56) References Cited

U.S. PATENT DOCUMENTS

| 2,407,680 A | 9/1946 | Palmquist |
| 3,591,531 A | 7/1971 | Schroeder |

(Continued)

FOREIGN PATENT DOCUMENTS

| CN | 101817975 | 9/2010 |
| CN | 103342968 | 10/2013 |

(Continued)

OTHER PUBLICATIONS

Aran, "Tailoring the Swelling and Glass-Transition Temperature of Acrylonitrile/Hydroxyethyl Acrylate Copolymers," Journal of Applied Polymer Science, 2010, vol. 116, pp. 628-635.
(Continued)

*Primary Examiner* — Prashant J Khatri
(74) *Attorney, Agent, or Firm* — Carlos M. Téllez Rodríguez; 3M Innovative Properties Company (57) ABSTRACT

A light directing article comprises an acrylic polyvinyl acetal film to protect the optical elements of the light directing article. The acrylic polyvinyl acetal film has a Tg of at least 30° C. and comprises a (meth)acrylic polymer and
(Continued)

polyvinyl acetal polymer. The acrylic polyvinyl acetal film is flexible and durable to mechanical deformation.

19 Claims, 2 Drawing Sheets

(51) Int. Cl.

| | | |
|---|---|---|
| *C08L 33/06* | (2006.01) | |
| *G02B 5/124* | (2006.01) | |
| *G02B 5/128* | (2006.01) | |
| *G02B 5/12* | (2006.01) | |
| *B32B 27/30* | (2006.01) | |
| *B32B 27/08* | (2006.01) | |
| *B29D 11/00* | (2006.01) | |
| B29K 31/00 | (2006.01) | |
| B29K 667/00 | (2006.01) | |

(52) U.S. Cl.
CPC .......... *B32B 27/306* (2013.01); *B32B 27/308* (2013.01); *C08L 29/14* (2013.01); *C08L 33/064* (2013.01); *G02B 5/12* (2013.01); *G02B 5/124* (2013.01); *G02B 5/128* (2013.01); *B29K 2031/04* (2013.01); *B29K 2667/003* (2013.01)

(56) References Cited

U.S. PATENT DOCUMENTS

| | | | |
|---|---|---|---|
| 3,661,588 A | 5/1972 | Chang | |
| 3,684,348 A | 8/1972 | Rowland | |
| 3,689,346 A | 9/1972 | Rowland | |
| 3,712,706 A | 1/1973 | Stamm | |
| 3,811,983 A | 5/1974 | Rowland | |
| 4,181,752 A | 1/1980 | Martens | |
| 4,202,600 A | 5/1980 | Burke | |
| 4,243,500 A | 1/1981 | Glennon | |
| 4,243,618 A | 1/1981 | Van Arnam | |
| 4,330,590 A | 5/1982 | Vesley | |
| 4,332,847 A | 6/1982 | Rowland | |
| 4,576,850 A | 3/1986 | Martens | |
| 4,588,258 A | 5/1986 | Hoopman | |
| 4,601,861 A | 7/1986 | Pricone | |
| 4,775,219 A | 10/1988 | Appeldorn | |
| 4,894,259 A | 1/1990 | Kuller | |
| 4,938,563 A | 7/1990 | Nelson | |
| 5,102,731 A | 4/1992 | Takimoto | |
| 5,156,863 A | 10/1992 | Pricone | |
| 5,450,235 A | 9/1995 | Smith | |
| 5,491,586 A | 2/1996 | Phillips | |
| 5,506,279 A | 4/1996 | Babu | |
| 5,642,222 A | 6/1997 | Phillips | |
| 5,691,845 A | 11/1997 | Iwatsuka | |
| 5,691,846 A | 11/1997 | Benson, Jr. | |
| 5,691,856 A | 11/1997 | Kardash | |
| 5,784,197 A | 7/1998 | Frey | |
| 5,902,836 A | 5/1999 | Bennett | |
| 6,200,666 B1 | 3/2001 | Christian | |
| 6,318,867 B1 | 11/2001 | Bancon, Jr. | |
| 6,319,985 B1 | 11/2001 | Bruning | |
| 6,350,036 B1* | 2/2002 | Hannington | G02B 5/128 |
| | | | 359/534 |
| 6,365,262 B1 | 4/2002 | Hedblom | |
| 6,576,396 B1 | 6/2003 | Leichsenring | |
| 6,664,020 B1 | 12/2003 | Warner | |
| 6,806,320 B2 | 10/2004 | Everaerts | |
| 7,072,333 B2 | 7/2006 | Ahn | |
| 7,188,960 B2 | 3/2007 | Smith | |
| 7,385,020 B2 | 6/2008 | Anderson | |
| 8,372,517 B2 | 2/2013 | Tokuchi | |
| 8,455,099 B2 | 6/2013 | Chevalier | |
| 9,447,218 B2 | 9/2016 | Mikayama | |
| 2003/0111519 A1 | 6/2003 | Kinney | |
| 2003/0224150 A1 | 12/2003 | Ludwig | |
| 2004/0253534 A1 | 12/2004 | Kidnie | |
| 2005/0003222 A1 | 1/2005 | Everaerts | |
| 2005/0181943 A1 | 8/2005 | Kidnie | |
| 2010/0015400 A1* | 1/2010 | Tokuchi | B32B 27/30 |
| | | | 428/172 |
| 2010/0055418 A1 | 3/2010 | Takamatsu | |
| 2010/0058656 A1 | 3/2010 | Chevalier | |
| 2011/0112247 A1 | 5/2011 | Tokuchi | |
| 2011/0282000 A1 | 11/2011 | Hayes | |
| 2012/0003468 A1 | 1/2012 | Husemann | |
| 2012/0229898 A1* | 9/2012 | Northey | G02B 5/124 |
| | | | 359/530 |
| 2012/0231269 A1 | 9/2012 | Nakagawa | |
| 2012/0260975 A1 | 10/2012 | Gerard | |
| 2012/0288692 A1 | 11/2012 | Broyles | |
| 2013/0004766 A1 | 1/2013 | Abe | |
| 2013/0034682 A1 | 2/2013 | Free | |
| 2013/0135731 A1 | 5/2013 | Smith | |
| 2014/0030538 A1 | 1/2014 | Boutillier | |
| 2014/0154505 A1 | 6/2014 | Steelman | |

FOREIGN PATENT DOCUMENTS

| | | |
|---|---|---|
| DE | 102005023405 | 1/2007 |
| EP | 0411839 | 2/1991 |
| EP | 0447115 | 9/1991 |
| EP | 0659844 | 6/1995 |
| EP | 0710545 | 5/1996 |
| EP | 0783550 | 7/1997 |
| EP | 0997750 | 5/2000 |
| EP | 1038665 | 9/2000 |
| EP | 2080786 | 7/2009 |
| EP | 2163571 | 3/2010 |
| EP | 2284221 | 2/2011 |
| EP | 2623525 | 8/2013 |
| EP | 2937733 | 10/2015 |
| JP | 641737 | 1/1989 |
| JP | 09324165 | 12/1997 |
| JP | 10168271 | 6/1998 |
| JP | 10292013 | 11/1998 |
| JP | 2000247014 | 9/2000 |
| JP | 2003040653 | 2/2003 |
| JP | 2004331413 | 11/2004 |
| JP | 2005015654 | 1/2005 |
| JP | 2007023145 | 2/2007 |
| JP | 2007277050 | 10/2007 |
| JP | 2008055690 | 3/2008 |
| JP | 2008106254 | 5/2008 |
| JP | 2009102467 | 5/2009 |
| JP | 5255390 | 4/2010 |
| JP | 2010083909 | 4/2010 |
| JP | 2011012127 | 1/2011 |
| JP | 2014224234 | 12/2014 |
| KR | 0148852 | 7/1996 |
| WO | WO 2003-012459 | 2/2003 |
| WO | WO 2005-023913 | 3/2005 |
| WO | WO 2005-058594 | 6/2005 |
| WO | WO 2006-094177 | 9/2006 |
| WO | WO 2007/121284 | 10/2007 |
| WO | WO 2009-041017 | 4/2009 |
| WO | WO 2009-146227 | 12/2009 |
| WO | WO 2010-078346 | 7/2010 |
| WO | WO 2011-042665 | 4/2011 |
| WO | WO 2012-069587 | 5/2012 |
| WO | WO 2012-136941 | 10/2012 |
| WO | WO 2013-014492 | 1/2013 |
| WO | WO 2013-019699 | 2/2013 |
| WO | WO 2013-019706 | 2/2013 |
| WO | WO 2013-019766 | 2/2013 |
| WO | WO 2014-050746 | 4/2014 |
| WO | WO 2014/115883 | 7/2014 |
| WO | WO 2014-156214 | 10/2014 |
| WO | WO 2014-172185 | 10/2014 |
| WO | WO 2015-002814 | 1/2015 |
| WO | WO 2015-064219 | 5/2015 |
| WO | WO 2015-157350 | 10/2015 |
| WO | WO 2016-094112 | 6/2016 |
| WO | WO 2016-094277 | 6/2016 |
| WO | WO 2016-094280 | 6/2016 |

(56) References Cited

FOREIGN PATENT DOCUMENTS

| WO | WO 2017-112453 | 6/2017 |
|----|----------------|--------|
| WO | WO 2017-112458 | 6/2017 |
| WO | WO 2017-112468 | 6/2017 |
| WO | WO 2017-112537 | 6/2017 |

OTHER PUBLICATIONS

Butvar, Polyvinyl Butyral Resin Properties and Uses, Solutia Inc., 2006, pp. 1-32.
Eastman, "Tenite™ Propionate 307E4000018 Clear, Trsp", Sep. 2000, [retrieved from the internet on Aug. 12, 2014], URL <http://ws.eastman.com/ProductCatalogApps/PageControllers/ProdDatasheet_PC.aspx?Pro>, pp. 1-2.
Introduction in Properties and Applications, KSE Mowital, 84 pages.
KSE, "Polyvinyl butyral of superior quality", Mowital, Sep. 2003, pp. 1-36.
Kuraray, "Mowital Pioloform", 2013, 44 pages, XP055396125.
Pocius, Adhesion and Adhesive Technology—An Introduction, 287-291, (2012).
Sideridou-Karayannidou, "Synthesis and characterization of copolymers of N-vinylcarbazole and N, N-dimethylaminoethyl acrylate," Polymer, 1999, vol. 40, No. 17, pp. 4915-4922.
Wakabayashi, "Studies on s-Triazines. I. Contrimerization of Trichloroacetonitrile With Other Nitriles," Bulletin of the Chemical Society of Japan, Oct. 1969, vol. 42, No. 10, pp. 2924-2930.
International Search Report for PCT International Application No. PCT/US2017/035882, dated Aug. 16, 2017, 5 pages.

\* cited by examiner

ACRYLIC POLYVINYL ACETAL FILM FOR A LIGHT DIRECTING ARTICLE

CROSS REFERENCE TO RELATED APPLICATIONS

This application is a national stage filing under 35 U.S.C. 371 of PCT/US2017/035882, filed Jun. 5, 2017, which claims the benefit of Provisional Application No. 62/346,788, filed Jun. 7, 2016, the disclosure of each application mentioned in this paragraph is incorporated by reference in their entirety herein.

FIELD

The present disclosure relates to an acrylic polyvinyl acetal film for a light directing article.

BACKGROUND

Light directing articles have an ability to manipulate incoming light. Light directing films and sheeting typically include an optically active portion that may be microstructured prisms or beads.

Light directing articles may allow portions of light to pass through the substrate in a controlled manner, such as light directing window film. In these types of light directing articles the optically active portion typically is a microstructured prism.

Light directing articles may redirect incident light towards its originating source, and are referred to as retroreflective articles. The ability to retroreflect light has led to the wide-spread use of retroreflective sheetings on a variety of articles. For retroreflective articles, the optically active portion typically is either a bead or a microstructured prism that is a cube-corner. Beaded sheeting employs a multitude of glass or ceramic microspheres to retroreflect incident light. Cube-corner sheeting, on the other hand, typically employs a multitude of rigid, cube-corner elements to retroreflect incident light. U.S. Pat. No. 2,407,680 shows an example of a beaded retroreflective sheeting, and U.S. Pat. No. 5,450,235 shows an example of a cube-corner retroreflective sheeting.

A specular reflective coating such as a metallic coating can be placed on the backside of the cube-corner elements to promote retroreflection. In addition to or in lieu of a metallic coating, a seal film can be applied to the backside of the cube-corner elements. The sealing film maintains an air interface at the backside of the cubes to enhance retroreflectivity. Various sealing films suitable for use with flexible retroreflective sheeting have been described. See for example U.S. Pat. Nos. 5,784,197; 5,691,846; and 6,318,867.

Light directing articles are used for signs, license plates, and safety clothing. Flexible light directing articles, such as retroreflective sheeting, are well-suited for use on irregular surfaces or for attachment to flexible or irregularly shaped substrates. Examples include temporary traffic control materials like barrels and cones), embossed license plates, and personal clothing (safety vests). In such applications, light directing articles should to be durable to mechanical deformation. It is important to protect the outer exposed surface of the light directing article because damage to the underlying optically active area can reduce or eliminate the optical function.

Traditionally, the films used to protect the optically active portions of the light directing film have been limited to just a few options, typically polyvinyl chloride (PVC, or vinyl) or poly (ethylene acrylic acid) copolymer, or EAA. PVC achieves its flexible properties through the extensive use of plasticizers, which are commonly surface active and thus prone to diffusion through the material. As a result, its properties can be unstable to environmental exposure.

EAA can be difficult to print and has reduced high temperature stability due to its crystalline melting point. These properties can be a challenge for the manufacturing and use conditions of prismatic retroreflective articles.

SUMMARY

The disclosed acrylic polyvinyl acetal film can be based on a wide range of (meth)acrylic monomers which can be copolymerized, as well as the range of polyvinyl acetal monomers available to react with them. Such flexibility provides for varying properties in acrylic polyvinyl acetal film for application with light directing articles. Light directing articles contain an optically active portion. To protect the optically active portion, the disclosed acrylic polyvinyl acetal film is included on the light directing article, which is flexible and durable to mechanical deformation.

In one embodiment, a light directing film is described comprising a body layer having a Tg ranging from 30° C. to 60° C. The body layer comprises a (meth)acrylic polymer and polyvinyl acetal polymer comprising polymerized units having the following formula wherein $R_1$ is hydrogen or a C1-C7 alkyl group. The light directing article further comprises a second layer proximate the body layer wherein the second layer comprises optical elements.

DETAILED DESCRIPTION

The disclosed light directing article 10 comprises a body layer 18 and a second layer with optical elements 12 and a body layer 18 adjacent to the optical elements 12. In some embodiments, the optical elements 12 are a plurality of beads. In some embodiments, the optical elements 12 are a plurality of microstructures. The microstructures can include prisms. In one embodiment, the microstructures can include cube corners. In some embodiments, the light directing article comprises additional layers, such as printing, protection, primer, or adhesive layers adjacent to the optical elements 12 or body layer 18 or between the optical elements 12 and body layer 18.

A "microstructure" as used herein as defined and explained in U.S. Pat. No. 4,576,850, the disclosure of which is herein incorporated by reference. Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005+/−0.1 or, preferably, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

The body layer 18 comprises an acrylic polyvinyl acetal layer, described in more detail below. In some embodiment, one or more of the additional layers included in the light directing article 10 comprises the disclosed acrylic polyvinyl acetal layer.

Examples of light directing article constructions comprising the disclosed acrylic polyvinyl acetal layer are described below. It is understood that descriptions might be with respect to retroreflective sheeting, but the general descriptions apply to other light directing articles.

Figure 1:
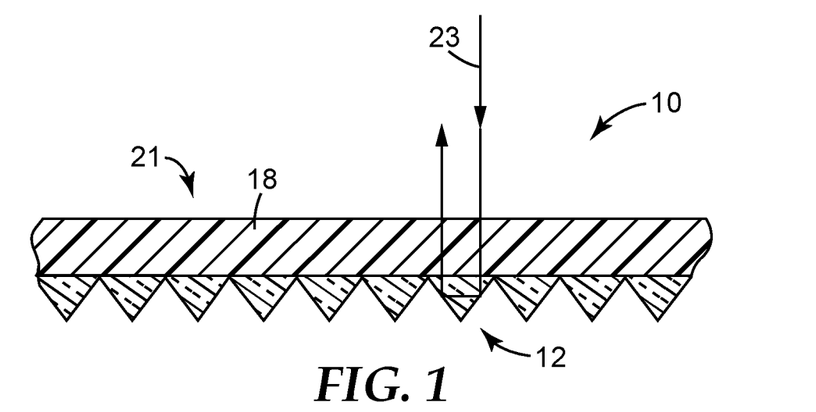
FIG. 1 is a side sectional view of one embodiment of a cube corner sheeting.

FIG. 1 shows one embodiment of a microstructured light directing sheeting 10 that comprises a multitude of prism elements 12 and a body layer 18. Body layer 18 may also be referred to as an overlay film, protection layer. Body layer 18 typically has a thickness of at least 20 micrometers and more typically at least 50 micrometer. Body layer 18 usually has a thickness less than 1,000 micrometer, and typically no greater than 250 micrometers. The prism elements 12 project from a first, typically rear side of body layer 18.

The prism elements 12 and body layer 18 are typically formed from a light transmissive polymeric material that is able to transmit at least 70 percent of the intensity of the light incident upon it at a given wavelength. In some embodiment, the light transmissibility is greater than 80 percent, and more preferably greater than 90 percent. In one embodiment, the body layer 18 is transparent. When the light directing sheeting 10 is employed for uses other than traffic safety, such as advertising displays, the light transmissibility may be as low as 5 to 10 percent.

In one embodiment, the body layer 18 is the outermost layer on the front side of the sheeting 10. As shown in FIG. 1, for a retroreflective sheeting, the prism elements 12 are cube-corners and the light enters the light directing sheeting 10 through the front surface 21. The light then passes through the body portion 18 and strikes the planar faces of the cube-corner elements 12 and returns in the direction from which it came as shown by arrow 23. The body layer 18 functions to protect the sheeting from outdoor environmental elements and/or provides mechanical integrity to the sheeting.

The microstructured light directing sheeting may optionally include a land layer 16 such as shown in U.S. Pat. No. 5,450,235, and shown in FIG. 5. In some embodiments, the land layer is integral with the microstructured elements meaning that the land and cubes are formed from a single polymeric material—not two different polymeric layers subsequently united together. Particularly for embodiments where the sheeting is flexible, the land layer 16, typically, has a thickness in the range of about 0 to 150 micrometers, and preferably in the range of approximately about 1 to 100 micrometers. The thickness of the land is preferably no greater than 10 percent of the height of the prism elements, and more preferably about 1 to 5 percent thereof. In sheetings having thicker land portions, it is typically more difficult to achieve decoupling of individual prism elements.

The prism elements 12 typically have a height in the range of about 20 to 500 micrometers, and more typically in the range of about 35 to 100 micrometers. Although the embodiment of the invention shown in FIG. 1 has a single body layer 18, there may be more than one body layer 18.

Figure 2:
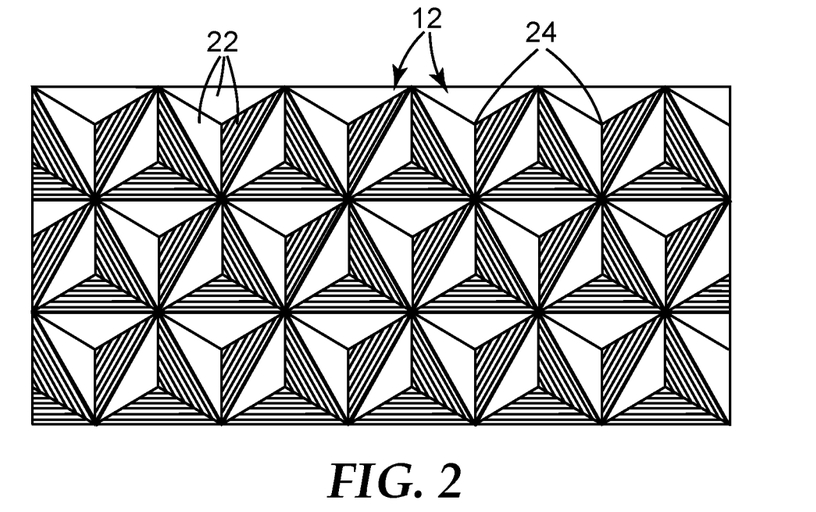
FIG. 2 is a side sectional view of another embodiment of a cube corner sheeting.

FIG. 2 illustrates a perspective view of one embodiment of a cube-corner element surface which is typically the back side of a retroreflective article. As shown, the cube-corner elements 12 are disposed as matched pairs in an array on one side of the sheeting. Each cube-corner element 12 has the shape of a trihedral prism with three exposed planar faces 22. The planar faces 22 may be substantially perpendicular to one another (as in the corner of a room) with the apex 24 of the prism vertically aligned with the center of the base. The angle between the faces 22 typically is the same for each cube-corner element in the array and will be about 90 degrees. The angle, however, can deviate from 90 degrees as is well-known. See, for example, U.S. Pat. No. 4,775,219 to Appledorn et al., the disclosure of which is herein incorporated by reference. The apex 24 of each cube-corner element 12 may be vertically aligned with the center of the base of the cube-corner element, see, for example, U.S. Pat. No. 3,684,348. The apex also may be canted to the center of the base as disclosed in U.S. Pat. No. 4,588,258. The present light directing article is not limited to any particular cube-corner geometry. Various cube-corner configurations are known such as described in U.S. Pat. Nos. 7,188,960; 4,938,563; 4,775,219; 4,588,258; 4,243,618; 4,202,600; and 3,712,706, the disclosures of which are herein incorporated by reference.

Figure 3:
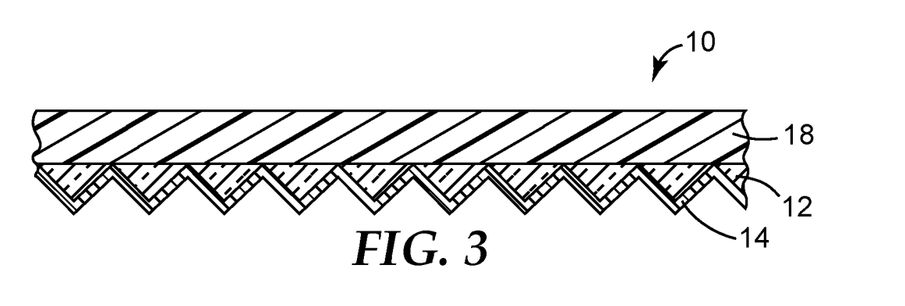
FIG. 3 is a side sectional view of another embodiment of a cube corner sheeting.
Figure 4:
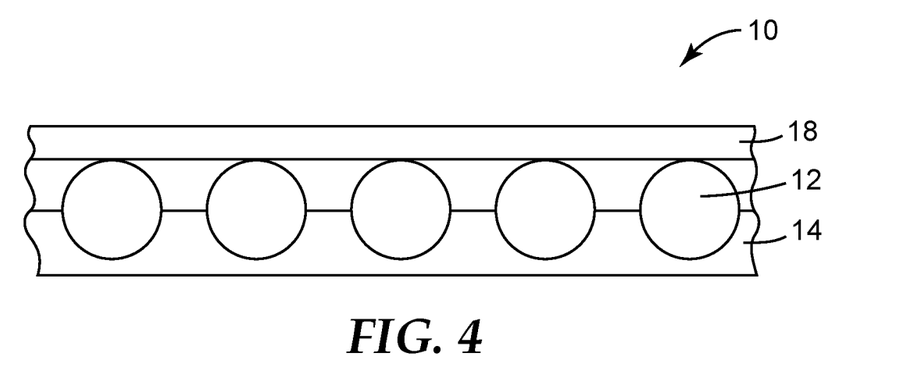
FIG. 4 is a side sectional view of one embodiment of a beaded sheeting

FIGS. 3 and 4 show embodiments of a microstructured article 10 with optical elements 12 and a specular reflective layer 14. In FIG. 3, the optical elements 12 are microstructured cube-corner elements. In FIG. 4, the optical elements 12 are beads. A specular reflective coating 14 such as a metallic coating can be placed on the backside of the optical elements 12 to promote retroreflection. The metallic coating can be applied by known techniques such as vapor depositing or chemically depositing a metal such as aluminum, silver, or nickel. A primer layer may be applied to the backside of the cube-corner elements to promote the adherence of the metallic coating. Body layer 18 is on the outer most surface to protect the optical elements 12.

Figure 5:
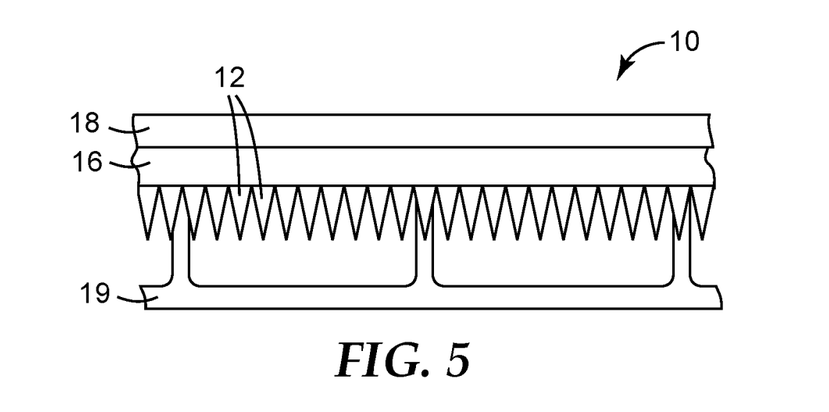
FIG. 5 is a side sectional view of another embodiment of a cube corner sheeting.

FIG. 5 shows an embodiment of a microstructured article 10 with a seal film 19. In addition to or in lieu of a specular reflective layer, a seal film 19 can be applied to the backside of the cube-corner elements 12; see, for example, U.S. Pat. Nos. 5,691,846; 5,784,197; and 6,318,867, the disclosure of which are herein incorporated by reference. In certain applications, this optional sealing layer 19 can provide significant protection for the microstructured elements from environmental effects, as well as maintaining a sealed air layer around the microstructured elements which is essential for creating the refractive index differential needed for total internal reflection. In embodiments having a seal film, such as shown in FIG. 5, the seal film may comprises a thermoplastic material. Such materials lend themselves well to fusing via relatively simple and commonly available thermal techniques.

For embodiments shown in FIGS. 1-5, an adhesive layer 20 (see FIG. 6), possibly covered with a removable release liner, can be included so that the microstructured article 10 can be secured to a substrate, such as a sign, license plate, window, or other display.

Figure 6:
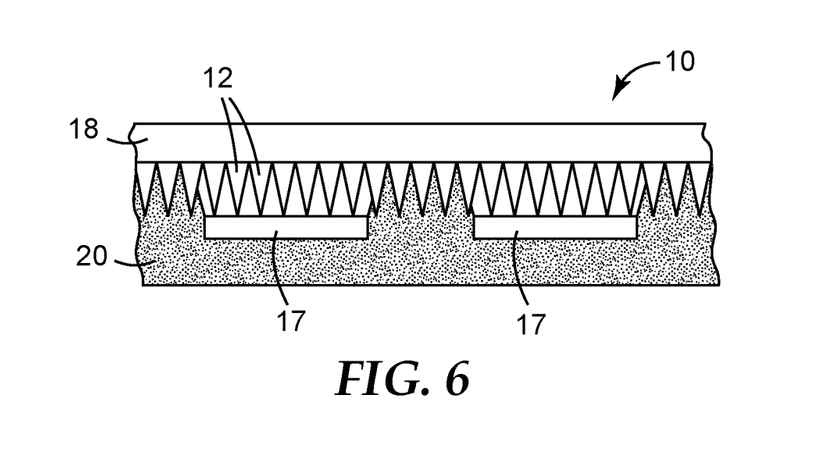
FIG. 6 is a side sectional view of another embodiment of a cube corner sheeting.

FIG. 6 shows an embodiment of a microstructured article 10 with barrier layers 17 on a pressure sensitive adhesive 20. The pressure sensitive adhesive 20 incorporates into the prism elements 12 in the area surrounding the barrier layers 17, while the barrier layers 17 prevent the underlying adhesive from making contact with the prism elements 12 to maintain an air interface at the backside of the adjacent prism elements 12 for creating a refractive index differential. The pressure sensitive adhesive 20 is able to secure the article 10 to a substrate, such as a sign, license plate, window, or other display. Further disclosure of barrier layer constructions can be found in U.S. Patent Application Publications U 2013/0034682 and 2013/0135731, herein incorporated by reference.

The microstructured elements tend to be hard and rigid. The polymeric composition used to make the microstructured elements may be thermoplastic, yet is preferably a reaction product of a polymerizable resin with multi-functionality that lead to cross-linking. The elastic modulus of the composition of the microstructured elements in one embodiment is greater than $16 \times 10^8$ pascals, in one embodiment is greater than $18 \times 10^8$ pascals, and in one embodiment is greater than $25 \times 10^8$ pascals.

The resin composition (and process conditions) of the microstructured elements is preferably chosen such that the resin is capable of penetrating the body layer, or overlay film, and then cured in situ or otherwise solidified, such that after curing, an interpenetrating network between the material of the microstructured elements and the body layer, as described in U.S. Pat. No. 5,691,856, herein incorporated by reference.

During curing or solidification of the microstructured element composition, depending on the composition of the cube corner material, individual microstructured elements may experience a certain degree of shrinking. If the elastic modulus of the body layer is too high, torsional stresses can be applied to the microstructured elements if they shrink during curing. If the stresses are sufficiently high, then the microstructured elements can become distorted with a resulting degradation in optical performance. When the elastic modulus of the body layer is sufficiently lower than the modulus of the microstructured element material, the body layer can deform along with the shrinking of microstructured elements without exerting such deformational stresses on the cube corner elements that would lead to undesirable degradation of the optical characteristics.

Thermoplastic compositions employed for forming the microstructured elements typically have a low linear mold shrinkage, i.e., less than 1 percent. As described in U.S. Pat. No. 5,691,845, the cube corner polymerizable resin compositions typically shrink upon curing. Typically, the resin will shrink at least 5 percent by volume when cured, more preferably between 5 and 20 percent by volume, when cured. The use of resin compositions that shrink is amenable to obtaining minimal thickness to the land 16.

In some embodiments, the microstructured elements (e.g., cube-corner) are preferably formed from a polymerizable resin capable of being crosslinked by a free radical polymerization mechanism by exposure to actinic radiation, for example, electron beam, ultraviolet light, or visible light. Alternatively or in addition to free radical polymerization, the polymerizable resin may be polymerized by thermal means with the addition of a thermal initiator such as benzoyl peroxide. Radiation-initiated cationically polymerizable resins also may be used.

The polymerizable resin composition comprises one or more polymerizable ethylenically unsaturated monomers, oligomers, prepolymers, or combination thereof. After curing, the ethylenically unsaturated components are reacted into a polymer. Preferred polymerizable compositions are 100% solids and substantially free of solvent.

The microstructured element composition may optionally comprise one or more reactive (e.g., ethylenically unsaturated) ingredients and/or one or more non-reactive ingredients. Various additives such as solvent, chain transfer agents, colorants (e.g., dyes), antioxidants, light stabilizers, UV absorbers, processing aids such as antiblocking agents, releasing agents, lubricants, and other additives may be added to the body portion or microstructured elements as described in U.S. Pat. No. 5,450,235 incorporated herein by reference.

When thermoplastic polymers are used in the microstructures (e.g., cube), the glass transition temperature generally is greater than 80° C., and the softening temperature is typically greater than 150° C. Generally, the thermoplastic polymers used in the microstructured layer are amorphous or semi-crystalline.

Examples of thermoplastic polymers that may be used in the microstructured elements include acrylic polymers such as poly(methyl methacrylate); polycarbonates; cellulosics such as cellulose acetate, cellulose (acetate-co-butyrate), cellulose nitrate; epoxies; polyesters such as poly(butylene terephthalate), poly(ethylene terephthalate); fluoropolymers such as poly(chlorofluoroethylene), poly(vinylidene fluoride); polyamides such as poly(caprolactam), poly(amino caproic acid), poly(hexamethylene diamine-co-adipic acid), poly(amide-co-imide), and poly(ester-co-imide); polyetherketones; poly(etherimide); polyolefins such as poly(methylpentene); poly(phenylene ether); poly(phenylene sulfide); poly(styrene) and poly(styrene) copolymers such as poly(styrene-co-acrylonitrile), poly(styrene-co-acrylonitrile-co-butadiene); polysulfone; silicone modified polymers (i.e., polymers that contain a small weight percent (less than 10 weight percent) of silicone) such as silicone polyamide and silicone polycarbonate; fluorine modified polymers such as perfluoropoly(ethyleneterephthalate); and mixtures of the above polymers such as a poly(ester) and poly(carbonate) blend, and a fluoropolymer and acrylic polymer blend.

Microstructured sheeting can be made according to a variety of known methods for making cube-corner sheeting such as described in U.S. Pat. Nos. 3,689,346; 3,811,983; 4,332,847; 4,601,861; 5,491,586; 5,642,222; and 5,691,846; incorporated herein by reference.

Microstructure articles, and in particular cube corner retroreflective sheeting, are commonly produced by first manufacturing a master mold that has a structured surface, such structured surface corresponding either to the desired cube corner element geometry in the finished sheeting or to a negative (inverted) copy thereof, depending upon whether the finished sheeting is to have cube corner pyramids or cube corner cavities (or both). The mold is then replicated using any suitable technique such as conventional nickel electroforming to produce tooling for forming cube corner retroreflective sheeting by processes such as embossing, extruding, or cast-and-curing. U.S. Pat. No. 5,156,863 (Pricone et al.) provides an illustrative overview of a process for forming tooling used in the manufacture of cube corner retroreflective sheeting. Known methods for manufacturing the master mold include pin-bundling techniques, direct machining techniques, and techniques that employ laminae such as described in U.S. Pat. No. 7,188,960. In some embodiments, the elements have a shape in plan view selected from trapezoids, rectangles, parallelograms, pentagons, and hexagons.

U.S. Pat. Nos. 3,684,348 and 3,811,983 describe retroreflective material and a method of making a composite material wherein a fluid molding material is deposited on a molding surface having cube corner recesses and a preformed body member applied thereto. The molding material is then hardened and bonded to the body member. The molding material may be a molten resin and the solidification thereof accomplished at least in part by cooling, the inherent nature of the molten resin producing bonding to the body member thereof. Alternatively, the molding material may be fluid resin having cross-linkable groups and the solidification thereof may be accomplished at least in part by cross-linking of the resin. The molding material may also be a partially polymerized resin formulation and wherein the solidification thereof is accomplished at least in part by polymerization of the resin formulation.

The polymerizable resin may be poured or pumped directly into a dispenser that feeds a slot die apparatus. For embodiments wherein the polymer resin is a reactive resin, the method of manufacturing the sheeting further comprises curing the resin in one or more steps. For example the resin may be cured upon exposure to a suitable radiant energy source such as actinic radiation, ultraviolet light, visible light, etc. depending upon the nature of the polymerizable resin to sufficiently harden the resin prior to removal from the tool. Combinations of cooling and curing may also be employed.

Flexible cube-corner retroreflective sheetings of the invention can be made by: (a) forming a plurality of cube-corner elements from a light transmissible material; and (b) securing a body layer to the plurality of cube-corner elements. In one embodiment, the method generally comprises providing a (e.g., heated) electroplated nickel tool having a molding surface with a plurality of cavities suitable for forming desired microstructure elements (e.g., cube corner elements of a retroreflective article) and applying to the molding surface a flowable (e.g., curable) resin composition in amount sufficient to at least fill the cavities. The (exposed substantially planar) resin composition surface is then contacted with a body layer film followed by curing the resin to form a composite sheeting comprising an array of microstructure elements (e.g., cube corner elements) bonded to the body layer. The composite sheeting is removed from the tool followed by applying mechanical stress to the sheeting so as to cause a fractured separation of substantially each individual microstructure element from surrounding microstructure elements, if they were connected by a land. Alternatively, the sheeting may be fractured such that a plurality of cube corner segments are formed, each segment comprising two or more cube corner elements. (See for example U.S. Pat. No. 6,318,867.)

In other embodiments, the second layer containing the optical elements may be first formed and then the body layer is attached to the second layer. For example, the second layer may be a substrate comprising a plurality of bead and then the body layer is attached to the second layer. When the body layer is separately applied for an already formed second layer, the body layer could be either adhesively bonded or thermally bonded to the second layer.

The body layer comprises polymerized units of one or more (meth)acrylate ester monomers derived from a (e.g. non-tertiary) alcohol containing 1 to 22 carbon atoms and in one embodiment an average of 4 to 12 carbon atoms.

Examples of monomers include the esters of either acrylic acid or methacrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol; 3,5,5-trimethyl-1-hexanol, 3-heptanol, 1-octanol, 2-octanol, isooctyl-alcohol, 2-ethyl-1-hexanol, 1-decanol, 2-propylheptanol, 1-dodecanol, 1-tridecanol, 1-tetradecanol, and the like.

The body layer comprises polymerized units of one or more low Tg (meth)acrylate monomers, i.e. a (meth)acrylate monomer when reacted to form a homopolymer has a T, no greater than 0° C. In some embodiments, the low Tg monomer has a T, no greater than −5° C., or no greater than −10° C. The Tg of these homopolymers is often greater than or equal to −80° C., greater than or equal to −70° C., greater than or equal to −60° C., or greater than or equal to −50° C. The film may be a monolithic film or a (e.g. exterior) layer of a multilayer film.

The low Tg monomer may have the formula wherein $R^1$ is H or methyl and $R^8$ is an alkyl with 1 to 22 carbons or a heteroalkyl with 2 to 20 carbons and 1 to 6 heteroatoms selected from oxygen or sulfur. The alkyl or heteroalkyl group can be linear, branched, cyclic, or a combination thereof.

Exemplary low Tg monomers include for example ethyl acrylate, n-propyl acrylate, n-butyl acrylate, isobutyl acrylate, t-butyl acrylate, n-pentyl acrylate, isoamyl acrylate, n-hexyl acrylate, 2-methylbutyl acrylate, 2-ethylhexyl acrylate, 4-methyl-2-pentyl acrylate, n-octyl acrylate, 2-octyl acrylate, isooctyl acrylate, isononyl acrylate, decyl acrylate, isodecyl acrylate, lauryl acrylate, isotridecyl acrylate, octadecyl acrylate, and dodecyl acrylate.

Low Tg heteroalkyl acrylate monomers include, but are not limited to, 2-methoxyethyl acrylate and 2-ethoxyethyl acrylate.

In some embodiments, the body layer comprises polymerized units of at least one low Tg monomer(s) having an alkyl group with 6 to 20 carbon atoms. In some embodiments, the low Tg monomer has an alkyl group with 7 or 8 carbon atoms. Exemplary monomers include, but are not limited to, 2-ethylhexyl (meth)acrylate, isooctyl (meth)acrylate, n-octyl (meth)acrylate, 2-octyl (meth)acrylate, isodecyl (meth)acrylate, and lauryl (meth)acrylate. In some embodiments, the monomer is an ester of (meth)acrylic acid with an alcohol derived from a renewable source, such as 2-octyl (meth)acrylate.

The body layer typically comprises at least 10, 15, 20, 25, 30, 35, 40, 50 wt.-% of polymerized units of monofunctional alkyl (meth)acrylate monomer having a Tg of less than 0° C., based on the total weight of the polymerized units (i.e. excluding inorganic filler or other additives). As used herein, wt.-% of polymerized units refers to the wt.-% based on the total weight of the (meth)acrylic polymer, polyvinyl acetal (e.g. butyral) polymer, and crosslinker when present. The body layer typically comprises no greater than 85, 60, 55, 50, 45, or 40 wt.-% of polymerized units of monofunctional alkyl (meth)acrylate monomer having a Tg of less than 0° C., based on the total weight of the polymerized units.

In other embodiments, the body layer comprises less than 10 wt.-% of polymerized units of monofunctional alkyl (meth)acrylate monomer having a Tg of less than 0° C. based on the total weight of the polymerized units of the (meth)acrylic polymer, polyvinyl acetal (e.g. butyral) polymer, and crosslinker when present. For example, the minimum concentration of polymerized units of monofunctional alkyl (meth)acrylate monomer having a Tg of less than 0° C. may be 0.5, 1, 2, 3, 4, 5, 6, 7, 8, or 9 wt.-%.

The polyvinyl acetal resin and types and amounts of free-radically polymerizable solvent monomer are selected such that the cured composition has a tensile elastic modulus of at least 1 MPa at 25° C. and 1 hertz.

When the body layer is free of unpolymerized components such as inorganic filler and additives, the wt.-% of specified polymerized units is approximately the same as the wt.-% of such polymerized units present in the total body layer composition. However, when the body layer composition comprises unpolymerized components, such as inorganic filler or other unpolymerizable additive the total body layer composition can comprise substantially less polymerized units. In general, the total amount of unpolymerizable additives may range up to 25 wt.-%. Thus, in the case of body layer comprising such unpolymerizable additives the concentration of specified polymerized units can be as much as 5, 10, 15, 20, 25, 30, 35 wt.-% less, depending on the total concentration of such additives. For example, when the body layer comprises 20 wt.-% inorganic filler, the concentration of low Tg monofunctional alkyl (meth)acrylate monomer may be 20% less, i.e. at least 8 wt.-%, 12 wt.-% etc.

The body layer generally comprises at least one (e.g. non-polar) high Tg monomer, i.e. a (meth)acrylate monomer when reacted to form a homopolymer has a Tg greater than 0° C. The high Tg monomer more typically has a Tg greater than 5° C., 10° C., 15° C., 20° C., 25° C., 30° C., 35° C., 40° C., 50° C., 75° C., 10° C.

In typical embodiments, the body layer comprises at least one high Tg monofunctional alkyl (meth)acrylate monomers including for example, t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, norbornyl (meth)acrylate, benzyl methacrylate, 3,3,5 trimethylcyclohexyl acrylate, cyclohexyl acrylate, and propyl methacrylate or combinations.

In some embodiments, the body layer comprises at least 1, 2, or 3 wt.-% up to 35 or 40 wt.-% of polymerized units of a monofunctional alkyl (meth)acrylate monomer having a Tg greater than 40° C., 50° C., 60° C., 70° C., or 80° C. based on the total weight of the polymerized units (i.e. excluding inorganic filler or other additives). In some embodiments, the body layer comprises no greater than 30, 25, 20, or 10 wt.-% of polymerized units of high Tg monofunctional alkyl (meth)acrylate monomer. Further, in some embodiments, the body layer comprises less than 1.0, 0.5, 0.1 wt.-% or is free of polymerized units of high Tg monofunctional alkyl (meth)acrylate monomer.

In other embodiments, the body layer comprises greater than 40 wt.-% of polymerized units of a monofunctional alkyl (meth)acrylate monomer having a Tg greater than 40° C. based on the total weight of the polymerized units of the (meth)acrylic polymer, polyvinyl acetal (e.g. butyral) polymer, and crosslinker when present. For example, the maximum concentration of polymerized units of a monofunctional alkyl (meth)acrylate monomer having a Tg greater than 40° C. may be 50, 60, 70, 80, or 90 wt.-%.

The Tg of the homopolymer of various monomers is known and is reported in various handbooks. The Tg of some illustrative monomers is also reported in PCT Application No. PCT/US2015/64215, filed Dec. 7, 2015; incorporated herein by reference. The polyvinyl acetal polymer is typically a random copolymer. However, block copolymer and tapered block copolymer may provide similar benefits as random copolymers.

In one embodiment, the body layer further comprises at least 10, 15 or 20 wt.-% and no greater than 65 wt.-% of polymerized units of polar monomers. In other embodiments, such as heat bondable films, the film and composition may comprise lower concentrations of polar monomers, ranging from about 1, 2, 3, 4, or 5 wt-% up to about 15 or 20 wt-% of the polymerized units. Such polar monomers generally aid in compatibilizing the polyvinyl acetal (e.g. butyral) resin with the high and low Tg alkyl (meth)acrylate solvent monomers. The polar monomer typically have a Tg greater than 0° C., yet the Tg may be less than the high Tg monofunctional alkyl (meth)acrylate monomer when high Tg monofunctional alkyl (meth)acrylate monomer is present.

Representative polar monomers include for example acid-functional monomers, hydroxyl functional monomers, nitrogen-containing monomers, and combinations thereof.

In some embodiments, the body layer comprises polymerized units of an acid functional monomer (a subset of high Tg monomers), where the acid functional group may be an acid per se, such as a carboxylic acid, or a portion may be salt thereof, such as an alkali metal carboxylate. Useful acid functional monomers include, but are not limited to, those selected from ethylenically unsaturated carboxylic acids, ethylenically unsaturated sulfonic acids, ethylenically unsaturated phosphonic acids, and mixtures thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and mixtures thereof.

In some embodiments, the body layer comprises 0.5 up to 20 or 25 wt.-% of polymerized units of acid functional monomers, such as acrylic acid. In some embodiments, the body layer composition comprises at least 1, 2, 3, 4, or 5 wt.-% of polymerized units of acid-functional monomers. In other embodiments, the body layer composition comprises less than 1.0, 0.5, 0.1 wt.-% or is free of polymerized units of acid-functional monomers.

In some embodiments, the body layer comprises non-acid-functional polar monomer.

One class of non-acid-functional polar monomers includes nitrogen-containing monomers. Representative examples include N-vinylpyrrolidone; N-vinylcaprolactam; acrylamide; mono- or di-N-alkyl substituted acrylamide; t-butyl acrylamide; dimethylaminoethyl acrylamide; and N-octyl acrylamide. In some embodiments, the body layer comprises at least 0.5, 1, 2, 3, 4, or 5 wt.-% of polymerized units of nitrogen-containing monomers and typically no greater than 25 or 30 wt.-%. In other embodiments, body layer comprises less than 1.0, 0.5, 0.1 wt.-% or is free of polymerized units of nitrogen-containing monomers.

Another class of non-acid-functional polar monomers includes alkoxy-functional (meth)acrylate monomers. Representative examples 2-(2-ethoxyethoxy)ethyl (meth)acrylate, 2-ethoxyethyl (meth)acrylate, 2-hydroxyethyl (meth)acrylate, 2-(methoxyethoxy)ethyl, 2-methoxyethyl methacrylate, and polyethylene glycol mono(meth)acrylates.

In some embodiments, the body layer comprises at least 0.5, 1, 2, 3, 4, or 5 wt.-% of polymerized units of alkoxy-functional (meth)acrylate monomers and typically no greater than 30 or 35 wt.-%. In other embodiments, the body layer comprises less than 1.0, 0.5, 0.1 wt.-% or is free of polymerized units of alkoxy-functional (meth)acrylate monomers.

Preferred polar monomers include acrylic acid, 2-hydroxyethyl (meth)acrylate; N,N-dimethyl acrylamide and N-vinylpyrrolidinone. The body layer generally comprises polymerized units of polar monomer in an amount of at least 10, 15 or 20 wt.-% and typically no greater than 65, 60, 55, 50 or 45 wt.-%.

The body layer may optionally comprise vinyl monomers including vinyl esters (e.g., vinyl acetate and vinyl propionate), styrene, substituted styrene (e.g., α-methyl styrene), vinyl halide, and mixtures thereof. As used herein vinyl monomers are exclusive of polar monomers. In some embodiments, the body layer comprises at least 0.5, 1, 2, 3, 4, or 5 wt.-% and typically no greater than 10 wt.-% of polymerized units of vinyl monomers. In other embodiments, the body layer comprises less than 1.0, 0.5, 0.1 wt.-% or is free of polymerized units of vinyl monomers.

In some favored embodiments, the polymerized units of the (meth)acrylic polymer contain aliphatic groups and lack aromatic moieties.

In typical embodiments, the solvent monomer(s) are polymerized to form a random (meth)acrylic polymer copolymer.

The polyvinyl acetal polymer is obtained, for example, by reacting polyvinyl alcohol with aldehyde, as known in the art and described in greater detail in previously cited PCT Application No. PCT/US2015/64215, filed Dec. 7, 2015.

The content of polyvinyl acetal (e.g. butyral) typically ranges from 65 wt.-% up to 90 wt.-% of the polyvinyl acetal (e.g. butyral) polymer. In some embodiments, the content of polyvinyl acetal (e.g. butyral) ranges from about 70 or 75 up to 80 or 85 wt.-%. The content of polyvinyl alcohol typically ranges from about 10 to 30 wt.-% of the polyvinyl acetal (e.g. butyral) polymer. In some embodiments, the content of polyvinyl alcohol of the polyvinyl acetal (e.g. butyral) polymer ranges from about 15 to 25 wt.-%. The content of polyvinyl acetate of the polyvinyl acetal (e.g. butyral) polymer can be zero or range from 1 to 8 wt.-% of the polyvinyl acetal (e.g. butyral) polymer. In some embodiments, the content of polyvinyl acetate ranges from about 1 to 5 wt.-%.

In some embodiments, the alkyl residue of aldehyde comprises 1 to 7 carbon atoms. In other embodiments, the alkyl reside of the aldhehyde comprises 3 to 7 carbon atoms such as in the case of butylaldehyde ($R_1=3$), hexylaldehyde ($R_1=5$), n-octylaldehyde ($R_1=7$). Of these butylaldehyde, also known as butanal is most commonly utilized. Polyvinyl butyral ("PVB") polymer is commercially available from Kuraray under the trade designation "Mowital™" and Solutia under the trade designation "Butvar™".

In some embodiments, the polyvinyl acetal (e.g. butyral) polymer has a Tg ranging from about 60° C. up to about 75° C. or 80° C. In some embodiments, the Tg of the polyvinyl acetal (e.g. butyral) polymer is at least 65 or 70° C. When other aldehydes, such as n-octyl aldehyde, are used in the preparation of the polyvinyl acetal polymer, the Tg may be less than 65° C. or 60° C. The Tg of the polyvinyl acetal polymer is typically at least 35, 40 or 45° C. When the polyvinyl acetal polymer has a Tg of less than 60° C., higher concentrations of high Tg monomers may be employed in the body layer composition in comparison to those utilizing polyvinyl butyral polymer. When other aldehydes, such as acetaldehyde, are used in the preparation of the polyvinyl acetal polymer, the Tg may be greater than 75° C. or 80° C. When the polyvinyl acetal polymer has a Tg of greater than 70° C., higher concentrations of low Tg monomers may be employed in the body layer composition in comparison to those utilizing polyvinyl butyral polymer.

In some embodiments, the polyvinyl acetal (e.g. PVB) polymer typically has an average molecular weight (Mw) of at least 10,000 g/mole or 15,000 g/mole and no greater than 150,000 g/mole or 100,000 g/mole. In some favored embodiments, the polyacetal (e.g. PVB) polymer has an average molecular weight (Mw) of at least 20,000 g/mole; 25,000; 30,000, 35,000 g/mole and typically no greater than 75,000 g/mole.

In some embodiments, the body layer comprises 5 to 30 wt.-% of polyvinyl acetal polymer such as polyvinyl butyral based on the total weight of the polymerized units of the (meth)acrylate polymer, polyvinyl acetal (e.g. butyral) polymer, and crosslinker when present. In some embodiments, the body layer comprises at least 10, 11, 12, 13, 14, or 15 wt.-% of polyvinyl acetal (e.g. PVB) polymer. In some embodiments, the body layer comprises no greater than 25 or 20 wt.-% of polyvinyl acetal (e.g. PVB) polymer. When the body layer comprises a polyvinyl acetal (e.g. PVB) polymer having an average molecular weight (Mw) less than 50,000 g/mole, the body layer may comprise higher concentration polyvinyl acetal (e.g. PVB) polymer such as 35 or 40 wt.-%. Thus, the film and composition comprises a minor amount of polyvinyl acetal (e.g. PVB) resin in combination with a major amount of (meth)acrylic polymer. The amount of (meth)acrylic polymer is typically at least 50, 55, 60, 65, 70, 75, 80, 85, 90, or 95 wt.-% of the film.

The heat bondable film and composition may comprise a lower amount of polyvinyl acetal resin such as polyvinyl butyral. In some embodiments, the heat bondable film and composition comprises at least 5, 6, 7, 8, 9, or 10 wt-% of polyvinyl acetal resin. In some embodiments, the heat bondable film and composition comprises no greater than 20, 19, 18, 17, 16, or 15 wt-% of polyvinyl acetal resin. When the film and composition comprises a polyacetal (e.g. PVB) resin having an average molecular weight (Mw) less than 50,000 g/mole, the film and composition may comprise higher concentration polyvinyl (e.g. PVB) acetal resin such as 25 or 30 wt-%.

In other embodiments, the body layer comprises less than 5 wt.-% of polyvinyl acetal (e.g. butyral) polymer based on the total weight of the polymerized units of the (meth)acrylic polymer, polyvinyl acetal (e.g. butyral) polymer, and crosslinker when present. For example, the minimum concentration of polyvinyl acetal (e.g. butyral) polymer may be 0.5, 1, 1.5, 2, 1.5, 3, 3.5, 4, or 4.5 wt.-%

In some embodiments, the body layer comprises polymerized crosslinker units. In some embodiments, the crosslinker is a multifunctional crosslinker capable of crosslinking polymerized units of the (meth)acrylic polymer such as in the case of crosslinkers comprising functional groups selected from (meth)acrylate, vinyl, and alkenyl (e.g. $C_3$-$C_{20}$ olefin groups); as well as chlorinated triazine crosslinking compounds.

Examples of useful (e.g. aliphatic) multifunctional (meth)acrylate include, but are not limited to, di(meth)acrylates, tri(meth)acrylates, and tetra(meth)acrylates, such as 1,6-hexanediol di(meth)acrylate, poly(ethylene glycol) di(meth)acrylates, polybutadiene di(meth)acrylate, polyurethane di(meth)acrylates, and propoxylated glycerin tri(meth)acrylate, and mixtures thereof.

In one embodiment, the crosslinking monomer comprises a (meth)acrylate group and an olefin group. The olefin group comprises at least one hydrocarbon unsaturation. The crosslinking monomer may have the formula:

$R1$ is H or $CH_3$,
L is an optional linking group; and
$R2$ is an olefin group, the olefin group being optionally substituted.

Dihydrocyclopentadienyl acrylate is one example of this class of crosslinking monomer. Other crosslinking monomers of this type comprising a $C_6$-$C_{20}$ olefin are described in WO2014/172185.

In other embodiments, the crosslinking monomer comprises at least two terminal groups selected from allyl, methallyl, or combinations thereof. An allyl group has the structural formula $H_2C=CH-CH_2-$. It consists of a methylene bridge ($-CH_2-$) attached to a vinyl group ($-CH=CH_2$). Similarly, a methallyl group is a substituent with the structural formula $H_2C=C(CH_3)-CH_2-$. The terminology (meth)allyl includes both allyl and methallyl groups. Crosslinking monomers of this types are described in PCT Publication WO2015/157350.

In some embodiments, the body layer may comprise a multifunctional crosslinker comprising vinyl groups, such as in the case of 1,3-divinyl tetramethyl disiloxane.

The triazine crosslinking compound may have the formula.

wherein $R_1$, $R_2$, $R_3$ and $R_4$ of this triazine crosslinking agent are independently hydrogen or alkoxy group, and 1 to 3 of $R_1$, $R_2$, $R_3$ and $R_4$ are hydrogen. The alkoxy groups typically have no greater than 12 carbon atoms. In favored embodiments, the alkoxy groups are independently methoxy or ethoxy. One representative species is 2,4,-bis(trichloromethyl)-6-(3,4-bis(methoxy)phenyl)-triazine. Such triazine crosslinking compounds are further described in U.S. Pat. No. 4,330,590.

In other embodiments, the crosslinker comprises hydroxyl-reactive groups, such as isocyanate groups, capable of crosslinking alkoxy group of the (meth)acrylic polymer (e.g. HEA) or polyvinyl alcohol groups of the polyvinyl acetal (PVB). Examples of useful (e.g. aliphatic) multifunctional isocyanate crosslinkers include hexamethylene diisocyanate, isophorone diisocyanate, as well as derivatives and prepolymers thereof.

Various combinations of two or more of crosslinkers may be employed.

When present, the crosslinker is typically present in an amount of at least 0.5, 1.0, 1.5, or 2 wt.-% ranging up to 5 or 10 wt.-% based on the total weight of the polymerized units of the (meth)acrylate polymer, polyvinyl acetal (e.g. butyral) polymer, and crosslinker. Thus, the body layer comprises such amount of polymerized crosslinker units.

In other embodiments, the body layer comprises greater than 10 wt.-% of polymerized crosslinker units based on the total weight of the polymerized units of the (meth)acrylic polymer, polyvinyl acetal (e.g. butyral) polymer, and crosslinker when present. For example, the maximum concentration of polymerized crosslinker units may range up to 50, 55, 60, 65, 70, 75 or 80 wt.-%.

The body layer can be polymerized by various techniques, yet is preferably polymerized by solventless radiation polymerization, including processes using electron beam, gamma, and especially ultraviolet light radiation. In this (e.g. ultraviolet light radiation) embodiment, generally little or no methacrylate monomers are utilized. Thus, the body layer comprises zero or no greater than 10, 9, 8, 7, 6, 5, 4, 3, 2, or 1 wt.-% of polymerized units of monomer having a methacrylate group. One method of preparing the body layer described herein comprises dissolving the polyvinyl acetal (e.g. PVB) polymer polymer in the unpolymerized solvent monomer(s) of the (meth)acrylic polymer forming a coatable composition of sufficient viscosity.

Another method includes partially polymerizing the solvent monomer(s) to produce a syrup composition comprising a solute (meth)acrylic polymer dissolved in unpolymerized solvent monomer(s).

The polyvinyl acetal (e.g. PVB) polymer can be added prior to and/or after partial polymerization of monomer(s) of the (meth)acrylic polymer. In this embodiment, the coatable composition comprises partially polymerized (e.g. alkyl (meth)acrylate) solvent monomers and polyvinyl acetal (e.g. PVB) polymer polymer. The coatable composition is then coated on a suitable substrate and further polymerized.

The viscosity of the coatable composition is typically at least 1,000 or 2,000 cps ranging up to 500,000 cps at 25° C. In some embodiments, the viscosity is no greater than 200,000; 100,000; 75,000; 50,000, or 25,000 cps. The coatable composition is coated on a suitable substrate such as a release liner, and polymerized by exposure to radiation.

The method can form a higher molecular weight (meth)acrylic polymer than can be used by solvent blending a prepolymerized (meth)acrylic polymer and polyvinyl acetal (e.g. PVB) polymer. Higher molecular weight (meth)acrylic polymer can increase the amount of chain entanglements, thus increasing cohesive strength. Also, the distance between crosslinks can be greater with a high molecular (meth)acrylic polymer, which allows for increased wet-out onto a surface of an adjacent (e.g. film) layer.

The molecular weight of the body layer composition can be increased even further by the inclusion of crosslinker.

The high molecular weight (meth)acrylic polymer as well as the body layer typically has a gel content (as measured according to the Gel Content Test Method described in the examples utilizing tetrahydrofuran (THF) of at least 20, 25 30, 35, or 40%. In some embodiments, the gel content is at least 45, 50, 55, 60, 65, 70, 75, 80, 85, 90, or 95%. The gel content is typically less than 100%, 99%, or 98%. When the (meth)acrylic polymer has a high gel content, it is typically not thermoplastic.

The polymerization is preferably conducted in the absence of unpolymerizable organic solvents such as ethyl acetate, toluene and tetrahydrofuran, which are non-reactive with the functional groups of the solvent monomer and polyvinyl (e.g. PVB) acetal. Solvents influence the rate of incorporation of different monomers in the polymer chain and generally lead to lower molecular weights as the polymers gel or precipitate from solution. Thus, the body layer composition can be free of unpolymerizable organic solvent.

Useful photoinitiators include benzoin ethers such as benzoin methyl ether and benzoin isopropyl ether; substituted acetophenones such as 2,2-dimethoxy-2-phenylacetophenone photoinitiator, available the trade name IRGACURE 651 or ESACURE KB-1 photoinitiator (Sartomer Co., West Chester, Pa.), and dimethylhydroxyacetophenone; substituted α-ketols such as 2-methyl-2-hydroxy propiophenone; aromatic sulfonyl chlorides such as 2-naphthalenesulfonyl chloride; photoactive oximes such as 1-phenyl-1, 2-propanedione-2-(O-ethoxy-carbonyl)oxime; mono- or bis-acrylphosphine oxides such as IRGANOX 819 or LUCIRIN TPO.

Preferred photoinitiators are photoactive compounds that undergo a Norrish I cleavage to generate free radicals that can initiate by addition to the acrylic double bonds. The photoinitiator can be added to the mixture to be coated after the polymer (e.g. syrup) has been formed, i.e., photoinitiator can be added. Such polymerizable photoinitiators are described, for example, in U.S. Pat. Nos. 5,902,836 and 5,506,279 (Gaddam et al.).

Such photoinitiators are typically present in an amount of from 0.1 to 1.0 wt.-%. Relatively thick coatings can be achieved when the extinction coefficient of the photoinitiator is low.

The body layer composition can be coated on an (e.g. unstructured) release liner using conventional coating techniques. For example, these film compositions can be applied by methods such as roller coating, flow coating, dip coating, spin coating, spray coating knife coating, and die coating. Coating thicknesses may vary. The film composition may be of any desirable concentration for subsequent coating, but is typically 5 to 30, 35 or 40 wt.-% polyvinyl acetal polymer solids in (meth)acrylic solvent monomer. The desired concentration may be achieved by further dilution of the coatable composition. The coating thickness may vary depending on the desired thickness of the (e.g. radiation) cured body layer.

The coated release liner may be brought in contact with the optical element layer, prior to curing. Alternatively the body layer may be cured prior to the optical element layer being disposed proximate the body layer.

The body layer composition and the photoinitiator may be irradiated with activating UV radiation having a UVA maximum in the range of 280 to 425 nanometers to polymerize the monomer component(s). UV light sources can be of various types. Low light intensity sources, such as blacklights, generally provide intensities ranging from 0.1 or 0.5 mW/cm$^2$ (millwatts per square centimeter) to 10 mW/cm$^2$ (as measured in accordance with procedures approved by the United States National Institute of Standards and Technology as, for example, with a UVIMAP UM 365 L-S radiometer manufactured by Electronic Instrumentation & Technology, Inc., in Sterling, Va.). High light intensity sources generally provide intensities greater than 10, 15, or 20 mW/cm$^2$ ranging up to 450 mW/cm$^2$ or greater. In some embodiments, high intensity light sources provide intensities up to 500, 600, 700, 800, 900 or 1000 mW/cm$^2$. UV light to polymerize the monomer component(s) can be provided by various light sources such as light emitting diodes (LEDs), blacklights, medium pressure mercury lamps, etc. or a combination thereof. The monomer component(s) can also be polymerized with higher intensity light sources as available from Fusion UV Systems Inc. The UV exposure time for polymerization and curing can vary depending on the intensity of the light source(s) used. For example, complete curing with a low intensity light course can be accomplished with an exposure time ranging from about 30 to 300 seconds; whereas complete curing with a high intensity light source can be accomplished with shorter exposure time ranging from about 5 to 20 seconds. Partial curing with a high intensity light source can typically be accomplished with exposure times ranging from about 2 seconds to about 5 or 10 seconds.

In some embodiments, the body layer is transparent having a transmission of visible light of at least 90 percent. In some embodiments, the body layer, as well as the composition of (meth)acrylic polymer, polyvinyl acetal (e.g. butyral), and crosslinker when present is transparent having a transmission of visible light of at least 90, 91, 92, 93, 94, or 95% as measured according to the test method described in the examples. In some embodiments, the clarity is at least 90, 91, 92, 93, 94, or 95%. The transmission and clarity are typically less than 100%. In some embodiments, the haze is less than 15% or 10%. In some embodiments, the haze is less than 9, 8, 7, 6, 5, 4, 3, or 2%. The haze may be at least 0.5%.

The body layer may optionally contain one or more conventional additives. Additives include, for example, antioxidants, stabilizers, ultraviolet absorbers, lubricants, processing aids, antistatic agents, colorants, impact resistance aids, fillers, matting agents, flame retardants (e.g. zinc borate) and the like. Some examples of fillers or pigments include inorganic oxide materials such as zinc oxide, titanium dioxide, silica, carbon black, calcium carbonate, antimony trioxide, metal powders, mica, graphite, talc, ceramic microspheres, glass or polymeric beads or bubbles, fibers, starch and the like.

When present, the amount of additive can be at least 0.1, 0.2, 0.3, 0.4, or 0.5 wt.-%. In some embodiments, the amount of additive is no greater than 25, 20, 15, 10 or 5 wt.-% of the total body layer composition. In other embodiments, the concentration of additive can range up to 40, 45, 50, 55 or about 65 wt.-% of the total body layer composition.

In some embodiments, the body layer is free of plasticizer, tackifier and combinations thereof. In other embodiments, the body layer composition comprise plasticizer, tackifier and combinations thereof in amount no greater than 5, 4, 3, 2, or 1 wt.-% of the total body layer composition. From the standpoint of tensile strength, it is preferable not to add a large amount of tackifier or plasticizer.

In some embodiments, the body layer composition comprises fumed silica. The concentration of (e.g. fumed) silica can vary. In some embodiments, the body layer comprises at least 0.5 or 1.0 wt.-% of (e.g. fumed) silica.

The body layer can be characterized using various techniques. Although the Tg of a copolymer may be estimated by use of the Fox equation, based on the Tgs of the constituent monomers and the weight percent thereof, the Fox equation does not take into effect interactions, such as incompatibility, that can cause the Tg to deviate from the calculated Tg. The Tg of the body layer refers to the midpoint Tg as measured by Differential Scanning Calorimetry, (DSC), according to the test method described in previously cited PCT Application No. PCT/US2015/64215, filed Dec. 7, 2015. When the film and (e.g. radiation) cured composition comprises a monomer having a Tg greater than 150° C., the upper limit of the DSC testing temperature is chosen to be higher than that of the highest Tg monomer. The midpoint Tg as measured by DSC is 10-12° C. lower than the peak temperature Tg as measured by Dynamic Mechanical Analysis (DMA) at a frequency of 10 Hz and a rate of 3° C./min. Thus, a Tg of 60° C. as measured according to DSC is equivalent to 70-72° C. when measured according to DMA as just described.

The Tg of the body layer and is generally at least 20, 25, or 30° C. ranging up to 55, 56, 57, 58, 59, or 60° C. In some embodiments, the Tg of the body layer is at least 31, 32, 33, 34, or 35° C. In other embodiments, the Tg of the body layer is at least 36, 37, 38, 39, or 40° C. In yet other embodiments, the Tg of the body layer is at least 41, 42, 43, 44, or 45° C. In some embodiments, the body layer exhibits a single Tg as measured by DSC. Thus, the (meth)acrylic polymer and polyvinyl acetal polymer composition can exhibit a single Tg. Thus, the polymerized (meth)acrylic polymer and polyvinyl acetal polymer composition alone or in combination with crosslinker can exhibit a single Tg.

A single Tg is one indication of a single (e.g. continuous) phase morphology. Thus, the film, as well as the polymerized (meth)acrylic polymer and polyvinyl acetal polymer composition alone or in combination with crosslinker can be characterized as a single continuous phase. Alternatively, the film or (e.g. radiation) cured composition can be tested by transmission electron microscopy (TEM) according to the test method described in cofiled U.S. Pat. No. 15,175,458. Single (e.g. continuous) phase morphology is preferred for films having low haze and high transmission.

In other embodiments, the film, as well as the polymerized (meth)acrylic polymer and polyvinyl acetal polymer composition alone or in combination with crosslinker can be characterized as having a dispersed phase of polyvinyl acetal (e.g. butyral) in a continuous phase of (meth)acrylic polymer. The average dispersion size can be calculated by averaging the diameter of randomly chosen particles (e.g. 100 particles) of the dispersed phase utilizing TEM. The average dispersion size can range from 0.1 to 10 microns. In some embodiments, the average dispersion size is less than 0.5, 0.3, 0.4, 0.3, 0.1 microns. An average dispersion size of less than 0.1 microns can also provide films having a low haze and high transmission.

The body layer can be characterized by tensile and elongation according to the test method described in previously cited PCT Application No. PCT/US2015/64215, filed Dec. 7, 2015. In some embodiments, the tensile strength is at least 10, 11, 12, 13, 14 or 15 MPa and typically no greater than 50, 45, 40, or 35 MPa. The elongation at break can ranges from 2, 3, 4 or 5% up to about 150%, 200% or 300% and greater. In some embodiments, the elongation is at least 50, 100, 150, or 175% and may range up to 225, 250, 275, or 300%.

The body layer is preferably non-tacky to the touch at room temperature (25° C.) and preferably at (e.g. storage or shipping) temperatures ranging up to (120° F.) 50° C. In some embodiments, the body layer may exhibit a low level of adhesion to glass. For example, the 180° peel values can be about 2 oz/inch or less at a 12 inch/minute peel rate.

In some embodiments, the body layer is suitable for use as a heat bondable film or heat bondable film layer. Heat bondable films can generally form a bond at a temperature ranging from about 50, 60 or 70° C. ranging up to about 140, 145, or 150° C. In some embodiments, the heat bonding is accomplished utilizing a pressure of about 5 to 20 psi for a duration of time of about 5, 10, 15, 20, 25, or 30 seconds.

The heat bondable body layer is suitable for bonding various metal (e.g. stainless steel) and polymeric (e.g. polycarbonate) substrates (such as in the manner described in the test method of the examples). In one embodiment, the body layer is heat bondable to polycarbonate at a temperature of 120° C. and exhibits a peel strength of at least 0.5, 0.6, 0.7, or 0.8 kg/cm ranging up to 2, 2.5, or 3 kg/cm at 25° C. after heat bonding. In another embodiment, the body layer is heat bondable to polycarbonate at a temperature of 120° C. and exhibits a peel strength of at least 1, 1.5, or 2 kg/cm ranging up to 3, 3.5, 4.0, 4.5 or 5 kg/cm at 70° C. after heat bonding.

The body layer is proximate to the second layer, which contains the optical elements. In one embodiment, the body layer is integrally connected with the second layer. For example, as the body layer may be formed directly onto the second layer. For example, the body layer may be thermally bonded to the second layer or may be adhesively bonded to the second layer. In one embodiment, the body layer is proximate to but spaced apart from the second layer by one or more additional layers. For examples, additional layers may be included between the second layer and the body layer. Typically, the body layer from an outermost surface of the light directing article.

The body layer may be in contact with the second layer or a primer or adhesion-promoting treatment may be disposed between on the body layer or the second layer. In yet another embodiment, an adhesive may be disposed between the body layer and second layer. In typical embodiments, the second layer is continuous and unstructured.

In some embodiments, the light directing film is conformable. By "conformable" it is meant that the film or film layer is sufficiently soft and flexible such that it accommodates curves, depressions, or projections on a substrate surface so that the film may be stretched around curves or projections, or may be pressed down into depressions without breaking or delaminating the film. It is also desirable that the film does not delaminate or release from the substrate surface after application (known as popping-up).

In some embodiments, the light directing film has sufficient inelastic deformation after being stretched so that when stretched, the film does not recover to its original length. In some embodiments, the overall light directing film has an inelastic deformation of at least 5% after being stretched once to 115% of their original length. In other embodiments, the conformability of the film, body layer, or backing as determined by % tensile set as described in PCT Application No. PCT/US2015/64215, filed Dec. 7, 2015, is at least 20, 25, or 30%.

In some embodiments, a layer of an adhesive composition is proximate the body layer or second backing. The adhesive is typically disposed directly on the body or second backing or may comprise a primer or adhesion promoting treatment between the body or backing and the adhesive layer. The type of primer will vary with the type of film and adhesive used and one skilled in the art can select an appropriate primer. The adhesive layer may be any suitable adhesive. Non-limiting examples of adhesives include pressure sensitive adhesives, heat activated adhesives, radiation curable adhesives, and the like. The adhesive layer may optionally be protected with a release liner.

The light directing article may be a thin film of sheeting that has a width bound by longitudinal edges. In one embodiment, the sheeting may be provided in a roll.

In many applications, light directing article includes printing on all or a portion of the material. The printing maybe on a surface of the body layer or second layer, or both. In one embodiment, the printing is on the surface of the second layer and the body layer is placed over the printed surface of the second layer film to protect the printing.

For a light directing article that is a retroreflective sheeting, the retroreflective sheeting is useful for a variety of uses such as traffic signs, pavement markings, vehicle markings, license plate, and personal safety articles, in view of its flexibility in combination with retroreflected brightness. The coefficient of retroreflection, $R_A$, may be measured according to US Federal Test Method Standard 370 at −4° entrance, 0° orientation, at various observation angles. Retroreflective sheeting typically has a coefficient of retroreflection, $R_A$, at −4° entrance, 0° orientation, and an observation angle of 0.2° of at least 50, 100, 150, 200, or 250 candelas/lux/m$^2$.

For a light directing article that is not retroreflective but light directing and therefore controlling the direction of light passing through the sheeting, the sheeting is useful for example to cover windows.

Due to the flexibility of the sheeting, the sheeting is amendable for application to flexible substrates such as canvas and other fabrics, corrugated or riveted surfaces, as well as curved surfaces having a simple or compound curve. The flexible retroreflective sheeting is also amenable for application to devices subject to thermal expansion and contraction (e.g., traffic devices such as barrels, cones).

Although specific embodiments have been shown and described herein, it is understood that these embodiments are merely illustrative of many possible arrangements. Numerous and varied other arrangements can be devised by those of skill in the art without departing from the spirit and scope of the invention. Thus, the scope of the present invention should not be limited to the structures described in this application, but only by the structures described by the language of the claims and the equivalents of those structures. The figures may not be drawn to scale.

EXAMPLES

Materials

| Designation | Description |
|---|---|
| EHA | 2-Ethylhexyl acrylate, available from BASF, Florham |
| IBOA | Isobornyl acrylate, available from San Esters, New York, |
| AA | Acrylic acid, available from BASF, Florham Park, NJ |
| HEA | 2-Hydroxyl ethyl acrylate, available from BASF, Florham Park, NJ |
| B60H | Poly(vinyl butyral) having a glass transition temperature (Tg) of 70° C., available under the trade designation MOWITAL B60H from Kuraray, Houston, TX. |
| Irg 651 | 2,2-Dimethoxy-1,2-diphenylethan-1-one, available under the trade designation IRGACURE 651 from BASF Corporation, Vandalia, IL |
| Irganox 1035 | A sulfur-containing, primary (phenolic) antioxidant and heat stabilizer used for processing stabilization of polyethylene wire and cable resins, available under the trade designation IRGANOX 1035 from BASF Corporation, Vandalia, IL |
| CN963B80 | An aliphatic polyester based urethane diacrylate oligomer blended with 20% SR238, hexane diol diacrylate available from Sartomer, Exton, PA, under the trade designation "CN 963 B80" |
| CN965 | An aliphatic polyester based urethane diacrylate oligomer available under the trade designation CN965 from Sartomer Americas, Exton, PA, |
| DESMODUR ™ XP 2617 | An NCO prepolymer based on hexamethylene diisocyanate, available from Bayer MaterialScience, Pittsburgh, PA, under the trade designation "DESMODUR XP 2617" |
| TMPTA | Trimethylolpropane triacrylate available from Allnex, Alpharetta, GA |
| Irg 651 | 2,2-Dimethoxy-1,2-diphenylethan-1-one, available under the trade designation IRGACURE 651 from BASF Corporation, Vandalia, IL |
| Irg 819 | Bis(2,4,6-trimethylbenzoyl)-phenylphosphineoxide, available under the trade designation IRGACURE 819 from BASF Corporation, Vandalia, IL |
| Tin 479 | A hydroxyphenyl-triazine (HPT) UV absorber, available under the trade designation TINUVIN 479 from BASF Corporation, Vandalia, IL |
| Tin 928 | A UV absorber of the hydroxyphenyl benzotriazole class, available under the trade designation TINUVIN 928 from BASF Corporation, Vandalia, IL |
| PET 1 | A silicone release liner having a nominal thickness of 51 micrometers (0.002 inches), obtained from Dupont Teijin, Dupont Chemical Company, Wilmington DE |

Test Methods

Retroreflective Brightness

The coefficient of retroreflection, $R_A$, was measured in accordance with standardized test ASTM E 810-03, where $R_A$ is expressed in candelas per lux per square meter (cd/(lux-square meter)). The entrance angle used in ASTM E 810-03 was 4 degrees, and the observation angle was 0.2 degrees.

TABLE 1

Base Syrup Formulations (parts by weight)

| Base Syrup | EHA | IBOA | AA | HEA | CN965:IBOA/ 1:1 | Irg 819 | Tin 928 | Tin 479 |
|---|---|---|---|---|---|---|---|---|
| 1 | 27.4 | 12.5 | 11.4 | 11.4 | 15.9 | 1 | 0.74 | 0.37 |

TABLE 2

Base Syrup Formulations (parts by weight)

| Base Syrup | EHA | B60H | IBOA | AA | HEA | CN963B80 | 2617 | Irg 651 | Irg 1035 | Tin 928 | Tin 479 |
|---|---|---|---|---|---|---|---|---|---|---|---|
| 2 | 29.1 | 16.2 | 8.1 | 19.9 | 19.9 | 2.5 | 2.5 | 0.3 | 0.2 | 0.74 | 0.37 |

TABLE 3

Adhesive Syrup Formulations (parts by weight)

| Adhesive Syrup | EHA | AA | Irg 651 | Irg 819 | TMPTA |
|---|---|---|---|---|---|
| 1 | 92.5 | 7 | 0.04 | 0.2 | 0.2 |

Adhesive Syrup 1

Adhesive Syrup 1 was prepared by charging a one gallon (3.8 liters) jar with IOA, AA, and Irg 651 in the amounts shown in Table 2, and stirred until the photoinitiator had dissolved and a homogeneous mixture was obtained. The mixture was degassed by introducing nitrogen gas into it through a tube inserted through an opening in the jar's cap and bubbling vigorously for at least 5 minutes. While stirring, the mixture was exposed to UV-A light until a pre-adhesive syrup having a viscosity deemed suitable for coating was formed. Following UV exposure, air was introduced into the jar. The light source was an array of LEDs having a peak emission wavelength of 365 nm. Following prepolymerization, 0.2 pph TMPTA was mixed into the syrup by rolling overnight.

Example 1

Base Syrup 1 was coated using a notch bar coater at a thickness of 0.002 inches (51 micrometers) onto a second sample of PET 1. Base Syrup 1 composition was exposed to a total UV-A energy of 3600 milliJoules/square centimeter using a plurality of fluorescent lamps having a peak emission wavelength of 350 nanometers, to give a non-pressure sensitive adhesive (PSA) acrylic film on PET 1. Adhesive Syrup 1 was coated onto PET 1 using a notch bar coater at a thickness of 0.002 inches (51 micrometers). The irradiated non-PSA acrylic film/PET 1 combination was brought into intimate contact with the Adhesive Syrup 1 coated PET 1 using two-roll coating station having a total gap setting of 0.008 inches (203 micrometers) and exposed to a total UV-A energy of 4263 milliJoules/square centimeter using a plurality of fluorescent lamps having a peak emission wavelength of 350 nanometers. A construction having, in order, PET 1, a PSA, a non-PSA acrylic film, and PET 1 was obtained. Next, PET 1 liner from Lot 9 from DLX2 run was removed to exposed the adhesive layer, then laminated to the top of 3M™ Advanced Engineer Grade Prismatic Sheeting Series 7930 with a hand squeeze roll laminator.

Example 2

Components of Base Syrup 2 were added MAX 100 WHITE SPEEDMIXER (available from FleckTek, Inc., Landrum, S.C.) and mixed at 3500 RPM for 5 minutes. Base Syrup 2 was coated at a thickness of 2.0 mils between untreated PET liners and exposed to UVA light. The total energy was measured using a Powermap™ radiometer equipped with a low intensity sensing head (available from EIT Inc., Sterling, Va.) and was 1824 mJ/cm$^2$.

A plurality of optically active elements, specifically, microreplicated cube corner structures were provided on a layer as generally described in U.S. Pat. No. 5,691,846, the disclosure of which is incorporated herein by reference in its entirety. The cube corner structure (prior to separating the structure into individual cubes) had 3 sets of intersecting grooves as having a pitch (i.e., primary groove spacing) of 0.004" with base triangle apertures of 58/58/64 degrees resulting in the height of the cube corner elements being 50.0 microns (2 mils).

The cube corner structures were formed using a resin prepared by combining 25 wt-% bisphenol A epoxy diacrylate, commercially available under the trade designation "Ebecryl 3720", 50 wt-% TMPTA (trimethylol propane triacrylate) and 25 wt-% 1,6 HDDA (hexanediol diacrylate). The formulation had 0.5 pph of TPO (2,4,6-trimethylbenzoyl diphenylphosphine oxide) photoinitiator and 0.5 pph of Darocure 1173 (2-hydroxy-2,2-dimethyl phenyl propane-1-one).

The body layer and PET carrier film then contacted the cube corner structures on a metal tool that was heated to 170° F. via a rubber nip roller having a gap set to minimize the amount of resin composition applied over the cavities of the tool. The resin of the cube corner structures was cured through the body layer and carrier film with two Fusion D UV lamps (available from Fusion Systems, Rockville, Md.) set at 360 and 600 W/in respectively. Dichroic filters were used in front of the UV lamps to minimize IR heating of the construction. Upon completion of the microreplication process and removal from the tool, the polymerizable resin side of the composite with the cube corner elements was irradiated by a Fusion D UV lamp operating at 75% to provide a post-UV irradiation cure. The construction was passed through an oven set at 170° F. to relax the stresses in the film.

The light directing article was then sealed using a seal film prepared as described in U.S. Patent Publication No. 2013/0034682, the disclosure of which is incorporated herein by reference in its entirety, except that a (1) flexographic printer was used to print the UVA curable ink on the adhesive layer, and (2) the printed pattern comprised 420 micron squares and a gap of 180 micro, for a total coverage of 49%.

The 0.2/−4 brightness of the sheeting constructed as such was 163 cd/lx/m2.

What is claimed is:

1. A light directing article comprising:
   a body layer having a Tg of at least 30° C. but no greater than 60° C. comprising a (meth)acrylic polymer and polyvinyl acetal polymer comprising polymerized units having the following formula wherein $R_1$ is hydrogen or a C1-C7 alkyl group; and
a second layer proximate the body layer, wherein the second layer comprises optical elements.

2. The light directing article of claim 1, wherein the body layer has a tensile elastic modulus of at least 1 MPa at 25° C. and 1 hertz.

3. The light directing article of claim 1, wherein the body layer comprises at least 20, 25, 30, 35, 40, 50 wt-% of polymerized units of monofunctional alkyl (meth)acrylate monomer having a Tg of less than 0° C.

4. The light directing article of claim 1, wherein the body layer comprises no greater than 85 wt-% of polymerized units of monofunctional alkyl (meth)acrylate monomer having a Tg of less than 0° C.

5. The light directing article of claim 3, wherein the polymerized units of monofunctional alkyl (meth)acrylate monomer has a Tg of less than −10° C., −20° C., −30° C., −40° C., or −50° C.

6. The light directing article of claim 1, wherein the body layer comprises polymerized units of an alkyl (meth)acrylate monomer having an alkyl group with eight carbon atoms.

7. The light directing article of claim 1, wherein body layer comprises 5 to 30 wt-% of polyvinyl acetal polymer.

8. The light directing article of claim 1, wherein the optical elements comprise beads or microstructured elements.

9. The light directing article of claim 8, wherein the microstructured elements are longitudinally extending prisms or cube-corner elements.

10. The light directing article of claim 9, wherein the cube-corner elements comprise truncated cubes or full cubes.

11. The light directing article of claim 1, wherein the body layer is integrally connected with the second layer.

12. The light directing article of claim 11, wherein the body layer is thermally bonded to the second layer.

13. The light directing article of claim 11, wherein the body layer is adhesively bonded to the second layer.

14. The light directing article of claim 1, wherein the light directing article is a roll of sheeting having a width bound by edges of the roll.

15. The light directing article of claim 1, further comprising a specular reflective coating adjacent to or on the optical elements.

16. The light directing article of claim 1, further comprising a seal film bonded to portions of the optical elements.

17. The light directing article of claim 1, further comprising: an adhesive layer comprising a first region and a second region, wherein the second region surrounds the first region and is in contact with the optical elements and wherein the first region and second region have different properties to form a low refractive index layer between the adhesive layer and the optical elements.

18. The light directing article of claim 1, further comprising an adhesive layer on the second layer, opposite the body layer.

19. The light directing article of claim 1, wherein the light directing article is a retroreflective sheeting.

* * * * *